United States Patent

Crespel et al.

[15] 3,707,606

[45] Dec. 26, 1972

[54] ARRANGEMENT FOR OPERATORS TELEPHONE SET

[72] Inventors: Michel Crespel, Franconville; Christian Valat, Bangui, both of France

[73] Assignee: Telefonaktiebolaget L M Ericsson, Stockholm, Sweden

[22] Filed: July 30, 1970

[21] Appl. No.: 59,569

[30] Foreign Application Priority Data

Aug. 5, 1969 France..................................6926875

[52] U.S. Cl. ..................................................179/81 B

[51] Int. Cl...................................................H04m 1/60

[58] Field of Search..................179/81 R, 81 B, 81 A

[56] References Cited

UNITED STATES PATENTS

| | | | |
|---|---|---|---|
| 3,602,648 | 8/1971 | Holtz | 179/81 A |
| 3,177,294 | 4/1965 | Schalkwijk | 179/81 B |
| 3,562,791 | 2/1971 | Baker | 179/81 B |
| 3,395,255 | 7/1968 | Clement | 179/81 B |
| 3,558,830 | 1/1971 | Bender | 179/81 R |

*Primary Examiner*—Kathleen H. Claffy
*Assistant Examiner*—William A. Helvestine
*Attorney*—Hane, Baxley & Spiecens

[57] ABSTRACT

Electronic arrangement for operators' telephone sets for connection to a telephone exchange of a local battery system as well as a central battery system. The arrangement comprises an amplifier having a selectably constant output level and a signal limiter for receiving and a sidetone-threshold circuit for transmission. The arrangement gives a considerable improvement of the receiving as well as of the transmission conditions for the operators, especially when many operators are stationed in the same room.

5 Claims, 6 Drawing Figures

Figure 1:
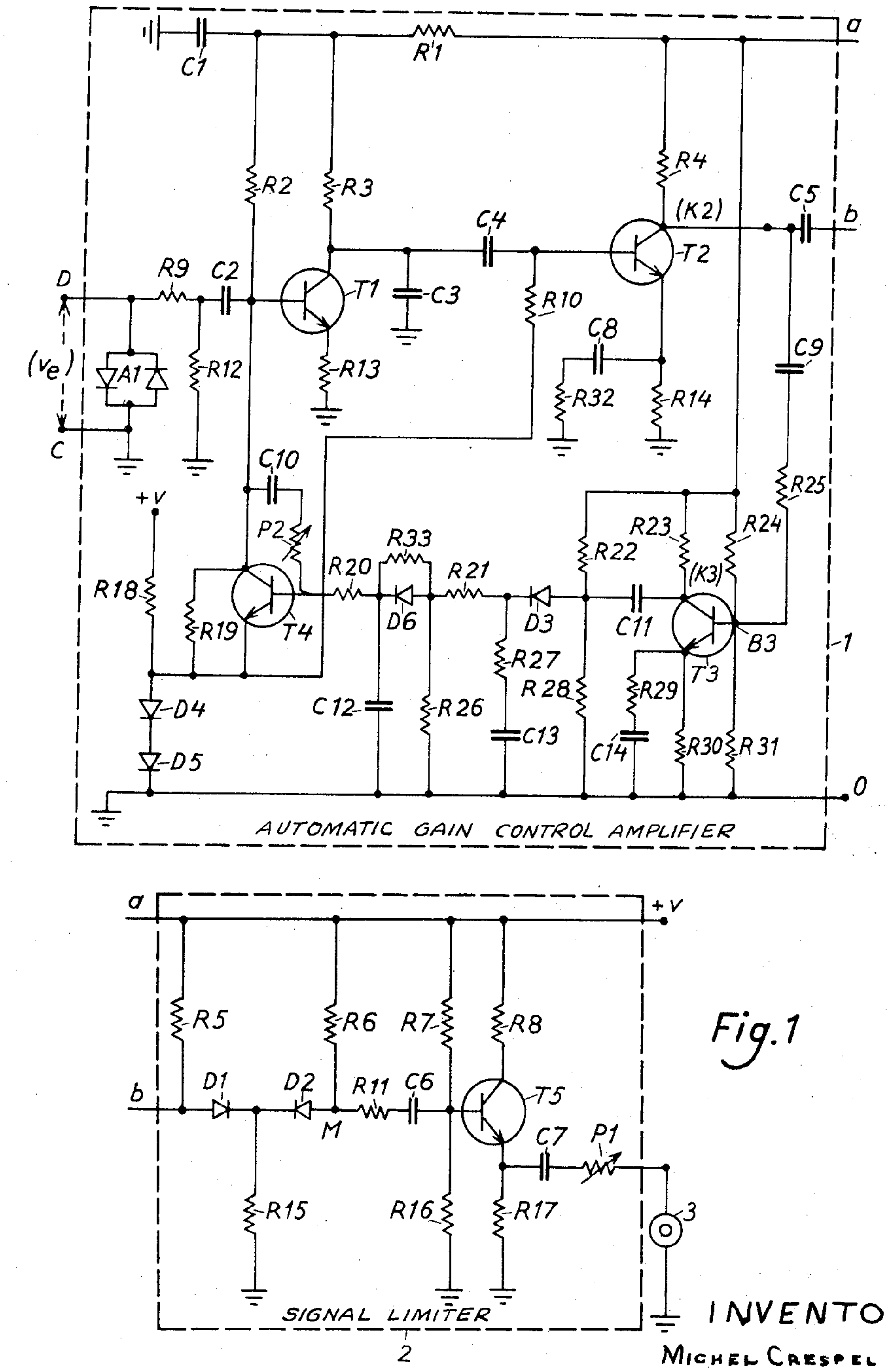

INVENTORS
MICHEL CRESPEL
CHRISTIAN VALAT

BY Hane, Baxley and Spiecens
ATTORNEYS

INVENTORS
MICHEL CRESPEL
CHRISTIAN VALAT
BY Hane, Baxley & Spiecens
ATTORNEYS

INVENTORS
MICHEL CRESPEL
CHRISTIAN VALAT

BY Hane, Baxley and Spiecens

ATTORNEYS

INVENTORS
MICHEL CRESPEL
CHRISTIAN VALAT

BY Hane, Baxley and Spiecens
ATTORNEYS

ARRANGEMENT FOR OPERATORS TELEPHONE SET

The present invention relates to an improved arrangement for operators' telephone sets. Since the telephone exchanges are placed in the terminal points of the communication chains, connected to the common network, the receiving level of the operators' telephone sets is often very low. This has the effect that it is difficult to hear, which is aggravated by the noise in the operating room when many operators are stationed in the same room. For that reason amplifiers for the receiving have been introduced. These amplifiers however involve many disadvantages.

The input levels upon receiving vary considerably, and for this reason a potentiometer has been introduced in the telephone set for the regulation of the amplification level. This potentiometer must often be controlled by the operator without solving the problem of the receiving in a satisfactory way.

The noise in the operating room is namely just as much amplified and disturbs the receiving considerably.

Moreover the numerous acoustic shocks have an influence on the telephone communications. A conventional amplifier reproduces them in an unpleasant and often intolerable manner, even though the acoustic shocks are of very short duration.

Thus the purpose of this invention is to provide an electronic arrangement for operators' telephone sets which removes said drawbacks.

An arrangement for operators' telephone sets according to the invention for connection to a telephone exchange of local battery or central battery system, comprising a transmitting microphone and a sound receiving means is substantially characterized by comprising in combination:

upon reception; an amplifier having a selectable constant output level, connecting to the line, and also a signal limiter in series with said amplifier and connected to the sound receiving means;

upon transmission: a sidetone-threshold circuit, on the one hand connected to the line, and on the other hand to the transmitting microphone;

a supply with a stabilized and filtered voltage.

The arrangement according to the invention is also characterized according to the following:

the amplifier with a constant output level consists of at least one amplifier stage, where the input is connected on the one hand to the signal limiter and on the other via a feedback circuit to the input of said amplifier stage;

said feedback circuit includes an input amplifier stage, the output of which is connected to a rectifying and filtering element being in its turn connected to a slave means consisting of a stage which controls the bias to the input stage of the feedback circuit;

the signal limiter includes two diodes which are symmetrically biased and, connected to an amplifier stage which also is connected to the sound reproducing means;

the sidetone-threshold circuit comprises a microphone, connected on the one hand directly to an output amplifier stage and on the other to a branch of the control circuit of said output amplifier stage and consisting of an amplifier stage connected also to a diode and a switch stage;

each amplifier stage comprises a transistor.

Figure 2:
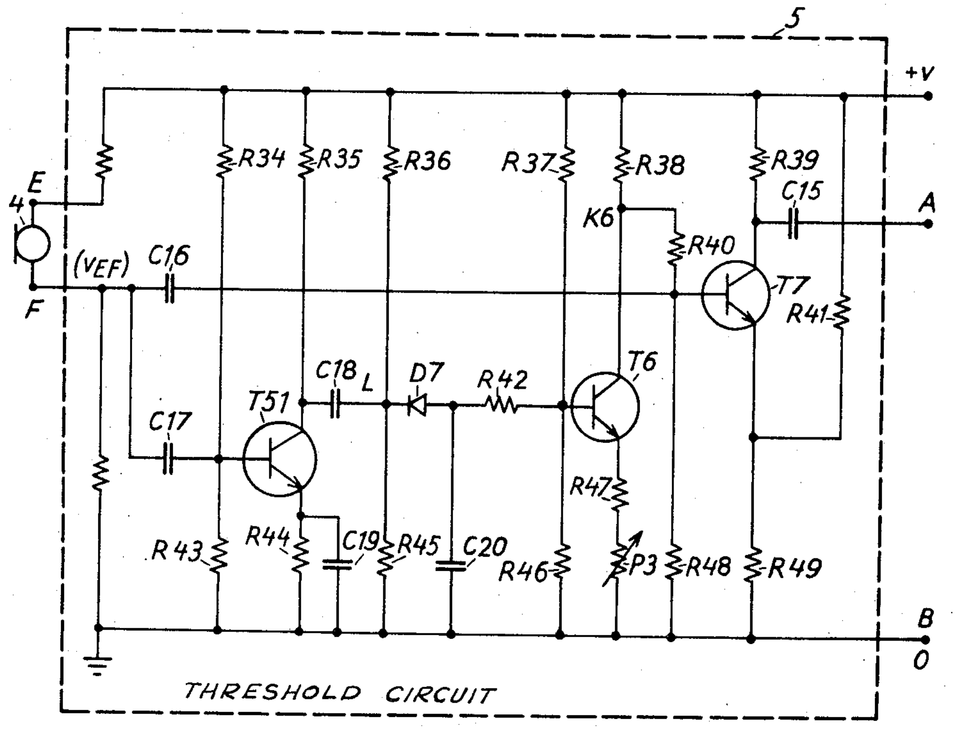
Figure 3:
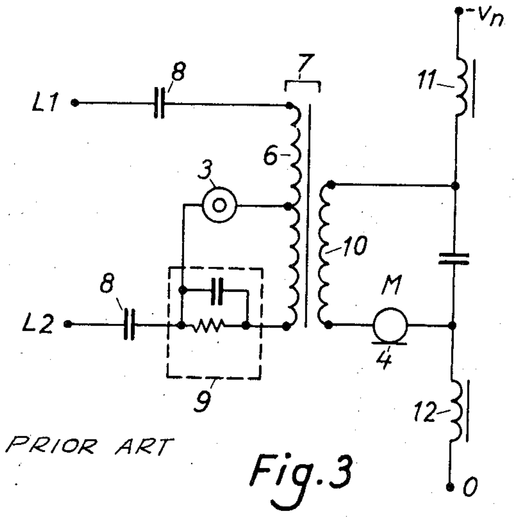
Figure 4:
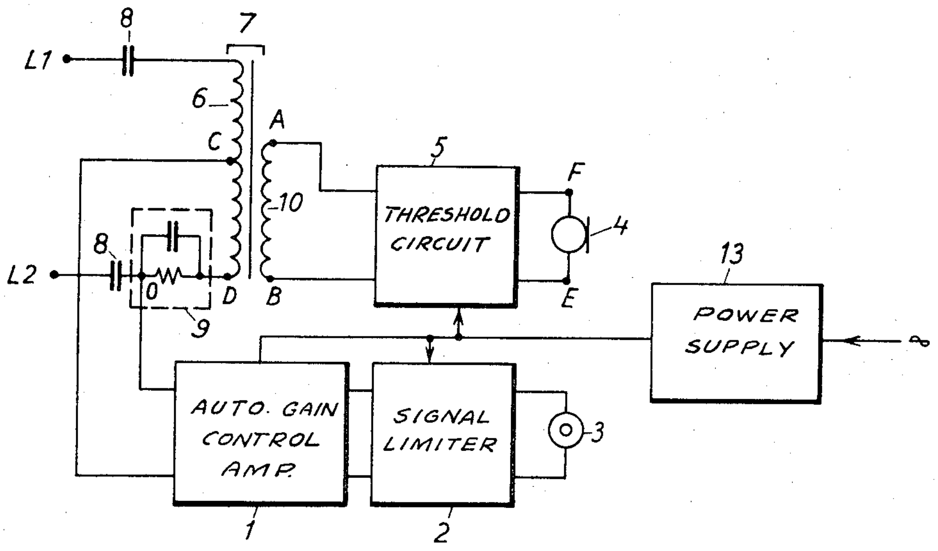
Figure 5:
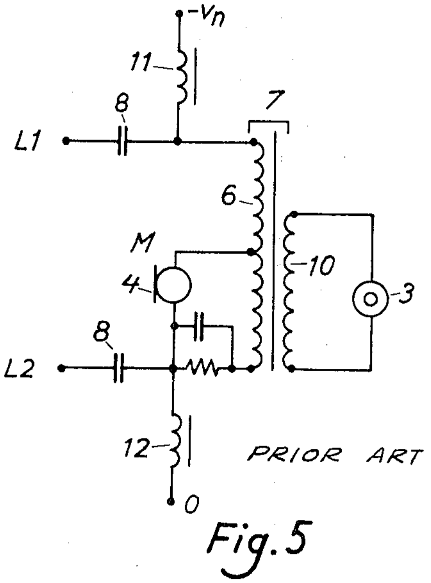
Figure 6:
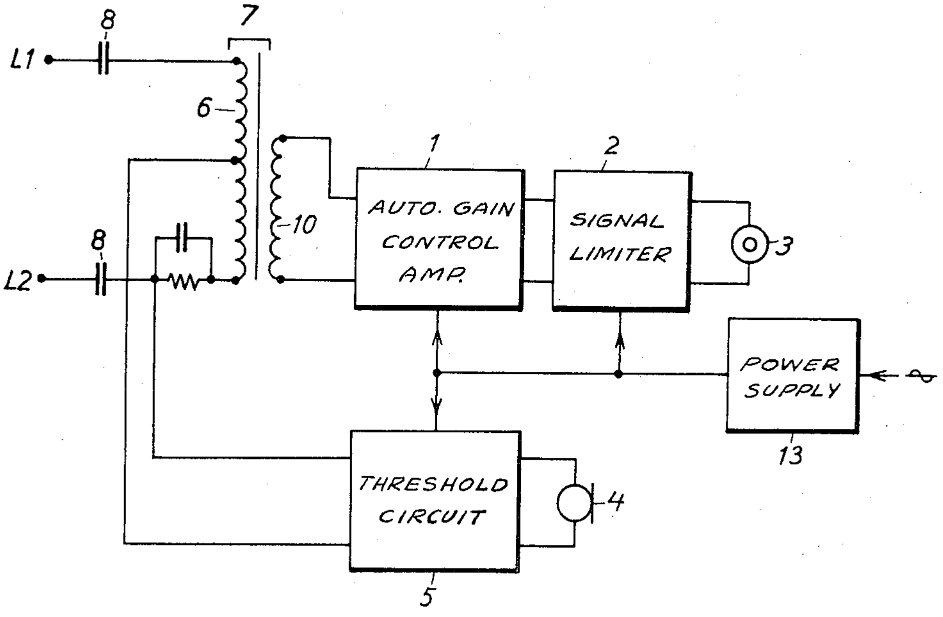

Other characteristics and advantages of this invention will be apparent from the following detailed description when read with the accompanying drawing in which FIG. 1 is a circuit diagram of a possible circuit solution for an amplifier having a constant level and a shock protector, FIG. 2 is a circuit diagram of a sidetone-threshold circuit according to the invention, FIG. 3 is a circuit diagram of a conventional operator's telephone set connection for local battery systems, FIG. 4 is a block diagram of an arrangement according to the invention, intended for local battery systems, FIG. 5 is a circuit diagram of a conventional operator's telephone set circuit for central battery systems and FIG. 6 is a block diagram of an arrangement according to the invention intended for central battery systems.

With reference to FIG. 1 the amplifier (an automatic gain control amplifier) with a constant output level, designated by 1, can be applied with advantage to attenuations of the input level of between 0 and 4 nepers and can be set to the value most fit for the operator.

The input voltage $v_e$ is amplified by the transistors T1 and T2 which results in a voltage $v_{K2}$ on the collector of transistor T2. An increase $dv_e$ of the input voltage corresponds to an increase $dv_{K2}$ of the voltage $v_{K2}$ which is divided into two parts:

one is fed to the signal limiter 2 via a capacitor C5, the other is transmitted to the feedback circuit via the capacitor C9.

The feedback circuit of the amplifier comprises:

an amplifier stage T3, a rectifying and filtering element including the diodes D3–D6, a slave means consisting of the transistor T4.

The transistor T3 amplifies the branch voltage variation $dv_{B3}$. This rectified and filtered voltage is superimposed on the bias voltage of the base of the transistor T4. This results in an increase in the base current of the transistor T4 and consequently in its collector current. To this increase in the collector current of transistor T4 corresponds a decrease in the base current of T1 and consequently a decrease in the amplification from the transistor T1.

Thus it is the question of an amplifier, the amplification of which varies inversely relative to the input voltage. This amplifier having a noticeably constant output level is particularly usable for the levels and impedances of telephone circuits.

As it has been mentioned earlier part of the signal $v_{K2}$ is supplied to the signal limiter circuit 2 via a capacitor C5.

The diodes D1 and D2 which are symmetrically biassed and do not allow any alternating current component above a certain amplitude to pass without deforming it, constitutes the series signal limiter. In case the amplitude of the supplied modulation is too great, there will be first a distortion, then a cutting off, and consequently a limiting of the amplitude at the point M. The signal obtained in M is then amplified by means of the transistor T5.

A potentiometer P1 allows selection of the receiving level of the telephone receiver 3 according to the wish of the user.

With reference to FIG. 2 the microphone 4 is connected to the terminals E and F of the sidetone-threshold circuit 5.

The input signal $v_{EF}$ is supplied to two branches in said circuit via the capacitors C16 and C17, respectively.

In the first branch the input signal is amplified by the output stage consisting of the transistor amplifier T7 and is then supplied to the telephone line via the terminals A and B which correspond to the terminals of the one winding of a transformer as it will be described below.

After amplification of part of the microphone modulation $v_{EF}$ by means of the transistor amplifier T51 T5 in the other branch, the voltage arising in point L is of such a magnitude that the current passing through the diode D7 is rising very swiftly simultaneously with the amplitude of the signal $v_{EF}$ . This implies that the base current of the transistor amplifier T6 passes towards zero and the transistor T6 is cut off. The voltage in the point K6 then has such a value as to deliver a positive bias to the base of the transistor T7 relative to the emitter, the potential of which is determined by the voltage divider R41, R49.

If the input voltage is too weak, the transistor T6 becomes conducting. This implies that the voltage in K6 decreases and the transistor T7 is cut off.

Thus in dependence on the amplitude of the input voltage, blocking or transmission occurs on the line.

As the microphone does not have a straight frequency characteristic within the telephone frequency band it is possible to modify it, obtaining in this way a function which with a sufficient accuracy reproduces the human voice.

The potentiometer P3 allows regulation of the transmission threshold which varies with the microphone type used and can be adapted to the level of noise in the room in which the operator's telephone set is placed.

Furthermore a sound damping circuit can likewise function together with a conventional receiver used as a microphone. For this purpose it is enough to modify the amplification of the circuit.

The last stage allows furthermore amplification at the transmission. For this purpose it is sufficient to modify the value of the collector resistance R39 of the transistor T7.

With reference to FIG. 3 the line L1–L2 is in the conventional local battery circuit connected to the primary winding 6 of a transformer 7 via capacitors 8. The telephone receiver 3 is shunt-connected to the winding 6 in series with a filter 9; the microphone 4 is connected in series with the secondary winding 10 of the transformer 7 and it is fed by means of choke coils 11 and 12.

With reference to FIG. 4 the arrangement according to the inven-tion for local battery systems consists of the above mentioned means, the amplifier 1 with a constant output level and the threshold circuit 2 connected in series between the tapping C-D ( corresponding to the terminals C-D in FIG. 1) from the winding 6 and the telephone receiver 3, and a threshold circuit 5 is connected between the terminals A-B ( corresponding to the terminals A-B in FIG. 2) of the winding 10 and the microphone 4. The operating voltages for the circuit are provided by means of an arrangement 13 which is of a suitable type and delivers a regulated and filtered voltage to the different means.

With reference to FIG. 5 the line L1–L2 is in the central battery circuit connected to the primary winding 6 of the transformer 7 via the capacitors 8. The microphone 4 is shunt-connected to the winding 6 and it is fed via the choke coils 11 and 12; the telephone receiver 3 is connected in series with the winding 10 of said transformer.

With reference to FIG. 6 the arrangement according to the invention for central battery systems consists of the above mentioned means, the amplifier 1 with a constant output level and the sound damping threshold circuit 2, connected in series between the terminals of the winding 10 and the telephone receiver 3, and the sound damping threshold circuit 5 is connected between the tapping from the winding 6 and the microphone 4. The operating voltages for the circuits are provided also in this case with the help of the arrangement 13, defined above.

The function of the circuits according to the invention is the same in the central battery case as in the local battery case. Only the last mentioned case is illustrated by the branching connections A,B,C,D which are common to the FIGS. 1,2 and 4.

In the different circuits described hereabove resistors and capacitors function of course in the usual way, except when particularly indicated, and which in this case have not been described in detail. It is furthermore a matter of course that the above mentioned circuits which contain transistors of the NPN-type, can be provided with transistors of the PNP-type by means of the common polarization switchings.

The circuits according to the invention afford many advantages. Particularly the amplifier with a constant level produces a noticeably constant receiving for all receiving levels which can occur in telecommunications. Otherwise the reaction time of the feedback is such as to result in a noticeable improvement of the receiving quality and herewith for the working conditions of the operators.

The signal limiter limits the jerky variations of the directly transmitted input voltage as the regulating chain in the amplifier with a constant level has a certain time constant. Moreover the function of the signal limiter produces an acoustic comfort which is extremely desirable for telephone exchanges having a large number of operators.

The sidetone-threshold circuit located between the microphone and the line, allows an elimination of the noise of the room which is fed back to the input of the amplifier. Only such signals which exceed a certain amplitude are transmitted by this "damping circuit" which is practically indispensable in this case as the amplification increases correspondingly to the input signal being too weak. Furthermore it can be used as a transmitting amplifier.

This invention is, of course, not limited to the embodiment described, but all technical equivalents can be used for the fundamental elements without thereby departing from the scope of the invention which is defined in the appended claims.

We claim:

1. Operator's telephone set in a telephone exchange comprising: an amplifier with a selectably constant output level, said amplifier having an input adapted to be connected to a line and an output; a receiver having an input for receiving signals for transducing to sound; a signal limiter serially connected between the output of said amplifier and the input of said receiver, said signal limiter including two diodes connected in series and oppositely polarized and means for symmetrically biasing said diodes; a microphone having an output; and a sidetone-threshold circuit having an input connected to the output of said microphone and an output adapted to be connected to the line; and a stabilized and filtered power supply for powering said amplifier, said signal limiter and said sidetone-threshold circuit.

2. The telephone set of claim 1 wherein the cathodes of said diodes are interconnected, the means for symmetrically biasing said diodes including direct current resistor means connecting the anodes and cathodes of said diodes to said power supply and wherein said signal limiter further comprises an input, an output, an amplifier stage connecting the anode of one of said diodes to said output and means for connecting the anode of the other of said diodes to said input.

3. The telephone set of claim 2 wherein said amplifier comprises an amplifier stage having a negative feedback network connecting the output to the input of the amplifier stage.

4. The telephone set of claim 2 wherein said negative feedback network includes a rectifying and filtering means having an input connected to the output of the amplifier stage, and a follower means having an input connected to the output of said rectifying and filtering means for controlling the operating bias of the amplifier stage.

5. The telephone set of claim 2 wherein said sidetone-threshold circuit comprises an output amplifier stage having an input connected to said microphone and an output adapted to be connected to the line, and a control means including a diode and a switch and having an input connected to said microphone and an output connected to said output amplifier stage for controlling the latter to operate only when the signal from said microphone exceeds a given amplitude.

* * * * *